United States Patent
Donya

(10) Patent No.: US 11,738,808 B2
(45) Date of Patent: Aug. 29, 2023

(54) TUNNEL HAVING INTEGRATED LATERAL REINFORCEMENTS

(71) Applicant: ArcelorMittal, Luxembourg (LU)

(72) Inventor: Gilson Donya, Nanterre (FR)

(73) Assignee: ArcelorMittal, Luxembourg (LU)

( * ) Notice: Subject to any disclaimer, the term of this patent is extended or adjusted under 35 U.S.C. 154(b) by 44 days.

(21) Appl. No.: 17/605,281

(22) PCT Filed: Apr. 2, 2020

(86) PCT No.: PCT/IB2020/053137
§ 371 (c)(1),
(2) Date: Oct. 21, 2021

(87) PCT Pub. No.: WO2020/217122
PCT Pub. Date: Oct. 29, 2020

(65) Prior Publication Data
US 2022/0219763 A1    Jul. 14, 2022

(30) Foreign Application Priority Data
Apr. 23, 2019    (WO) .................. PCT/IB2019/053328

(51) Int. Cl.
*B62D 25/20*    (2006.01)
*B62D 29/00*    (2006.01)

(52) U.S. Cl.
CPC .......... *B62D 25/20* (2013.01); *B62D 29/007* (2013.01)

(58) Field of Classification Search
CPC ............... B62D 25/20; B62D 25/2018; B62D 25/2027; B62D 25/2036; B62D 29/007
See application file for complete search history.

(56) References Cited

U.S. PATENT DOCUMENTS

| 2004/0140690 | A1* | 7/2004 | Watanabe | B62D 25/20 296/184.1 |
| 2005/0140179 | A1 | 6/2005 | Morsch et al. | |
| 2008/0315629 | A1 | 12/2008 | Abe et al. | |
| 2012/0049582 | A1 | 3/2012 | Klimek et al. | |
| 2012/0274100 | A1* | 11/2012 | Mildner | B62D 25/2036 296/193.07 |

(Continued)

FOREIGN PATENT DOCUMENTS

| CN | 104890466 A | 9/2015 |
| CN | 106103251 A | 11/2016 |

(Continued)

OTHER PUBLICATIONS

See Search Report of PCT/IB2020/053137 dated Sep. 7, 2020.

*Primary Examiner* — Gregory A Blankenship
(74) *Attorney, Agent, or Firm* — Davidson, Davidson & Kappel, LLC

(57) ABSTRACT

Tunnel 1 for a motor vehicle 2 made of a single part and including a main tunnel portion 3 and at least one lateral reinforcement element 5 located on the side of the main tunnel portion 3, wherein the lateral reinforcement element 5 is equipped with a groove 19 to provide high stiffness and high crash resistance and wherein the groove 19 extends over at least part of an inflexion region 15 between the longitudinally oriented part of the tunnel 1 and the upward oriented part of the tunnel 1 and extends over at least part of the front portion of the longitudinally oriented part of the tunnel 1.

18 Claims, 5 Drawing Sheets

(56) References Cited

U.S. PATENT DOCUMENTS

| | | | |
|---|---|---|---|
| 2017/0001669 A1* | 1/2017 | Ohigashi | B62D 25/2045 |
| 2017/0080978 A1* | 3/2017 | Yoshida | B62D 25/2018 |
| 2018/0099700 A1 | 4/2018 | Daigaku et al. | |
| 2018/0201326 A1* | 7/2018 | Geng | B60R 19/34 |
| 2019/0077464 A1* | 3/2019 | Izutsu | B62D 25/14 |
| 2019/0217494 A1* | 7/2019 | Rydh | B26F 3/004 |
| 2019/0232773 A1* | 8/2019 | Kasai | B62D 21/157 |
| 2019/0382054 A1* | 12/2019 | Natsume | B62D 25/2018 |
| 2021/0061365 A1* | 3/2021 | Ebisumoto | B62D 25/2036 |
| 2022/0009559 A1* | 1/2022 | Hirose | B62D 25/20 |
| 2022/0219763 A1* | 7/2022 | Donya | B62D 25/20 |
| 2022/0315111 A1* | 10/2022 | Sotty | B62D 25/2045 |
| 2022/0396138 A1* | 12/2022 | Lang | B60L 50/66 |
| 2023/0027898 A1* | 1/2023 | Marquez Duran | B62D 25/20 |

FOREIGN PATENT DOCUMENTS

| | | |
|---|---|---|
| DE | 10 2012 022935 A1 | 5/2013 |
| DE | 10 2014 007749 A1 | 12/2014 |
| GB | 2485633 A | 5/2012 |
| JP | 2007083868 A | 4/2007 |
| JP | 2008049922 A | 3/2008 |
| JP | 2008184125 A | 8/2008 |
| JP | 2008265691 A | 11/2008 |
| JP | 2010188965 A | 9/2010 |
| JP | 2018062204 A | 4/2018 |
| JP | 2018149912 A | 9/2018 |
| RU | 56320 U1 | 9/2006 |
| RU | 159867 U1 | 2/2016 |
| WO | WO 2008/084097 A1 | 7/2008 |
| WO | WO2018029941 A1 | 2/2018 |
| WO | WO2018061526 | 4/2018 |

\* cited by examiner

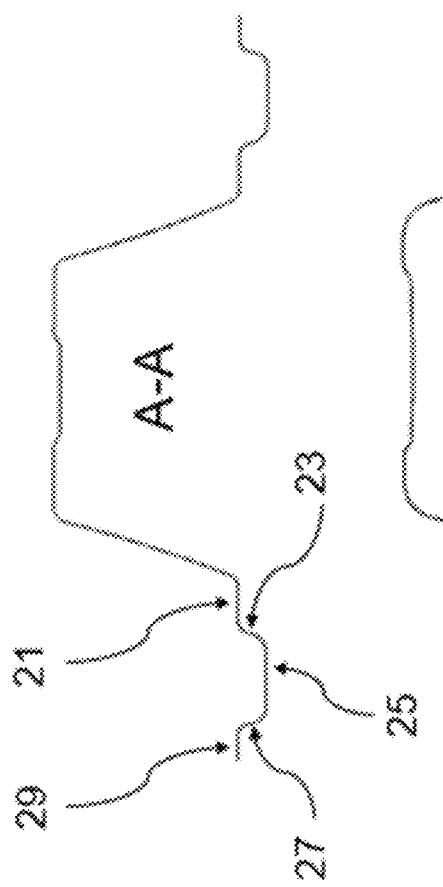
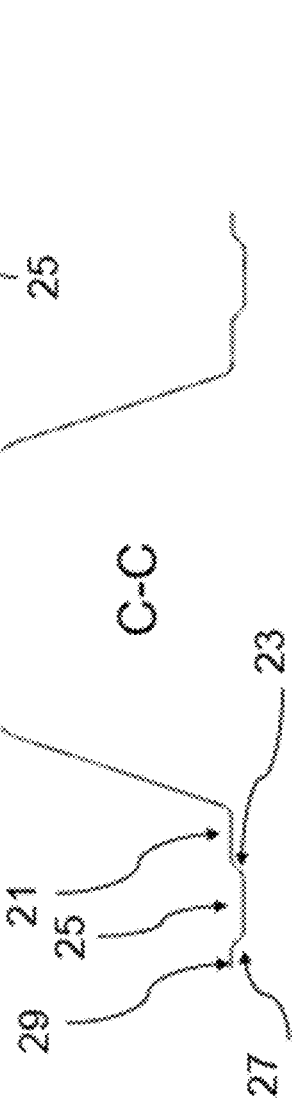

TUNNEL HAVING INTEGRATED LATERAL REINFORCEMENTS

The present invention relates to a tunnel for an automotive vehicle and to the lateral reinforcement structure of said tunnel. The present invention further relates to a method for producing such a tunnel.

BACKGROUND

In an automotive vehicle, the tunnel is a hollow recess located in the front floor reinforcement structure of the passenger compartment, which houses the exhaust system in a traditional combustion engine vehicle. A tunnel can also be present in electric or hybrid vehicles, for example to serve as a housing area for at least part of the battery pack serving to power the electrical motor or motors of the vehicle.

The basic shape of the tunnel consists of two vertical walls linked by a horizontal top wall. The tunnel can also include flanges on the bottom side of the vertical walls, to serve as fixation areas between the tunnel and the rest of the floor structure. The tunnel can be made of a single part or can consist of an assembly of several individual parts.

In order to accommodate the general shape of the lower dash panel, the lower contour of the vertical walls of the tunnel taper upwards at the front end of the tunnel, to form what is commonly referred to as the tunnel nose.

Because the tunnel forms part of the floor reinforcement structure of the vehicle, it contributes to the overall stiffness of the vehicle and also contributes to ensuring the safety of the vehicle occupants during a crash.

The tunnel is more specifically involved in the following static loading conditions, according to automotive manufacturer's requirements:
  global bending stiffness of the body in white structure
  global torsional stiffness of the body in white structure.

The tunnel is more specifically involved in the following crash resistance conditions:

The front impact, as described in various standardized tests, such as for example, the "frontal crash full width rigid barrier 50 Km/h" of the Euro NCAP (New Car Assessment Program) and of the IIHS (Insurance Institute for Highway Safety), also known as the full-frontal crash test.

The Euro-NCAP 40% Overlap Deformable Barrier (ODB), in which a vehicle having an initial velocity of 64 km/h is impacted against a normalised deformable barrier which overlaps 40% of the front part of the vehicle upon impact.

SUMMARY OF THE INVENTION

In order to meet the stiffness targets and crash resistance targets of the vehicle, the tunnel needs to be reinforced on its sides. This is particularly critical in the inflexion area linking the tunnel nose with the rear end of the tunnel, because the geometrical singularity of this inflexion area makes it particularly prone to deformation under static or dynamic loading.

It is known in the prior art to attach a lateral reinforcement structure to the tunnel, in particular to reinforce the vertical walls in the inflexion area between the rear end and the nose of the tunnel. This lateral reinforcement structure consists of one or several parts which are attached to the tunnel, for example by spot welding.

However, the use of such a lateral reinforcement structure poses several challenges in terms of manufacturing efficiency and production costs. Indeed, the use of such additional parts involves further operations during vehicle manufacturing such as stamping and assembling, which diminish overall productivity and increase the total cost of the vehicle. Furthermore, because these further reinforcement parts are involved in the overall stiffness and the crash resistance of the vehicle, they are identified as safety parts by the car manufacturer, which means that they are submitted to further quality control procedures and which also means that special care must be taken when assembling said reinforcement parts to the tunnel. These elements in turn further diminish overall productivity and further increase total vehicle costs.

It is an object of the present invention to overcome these limitations by providing a tunnel which does not need to be further reinforced to meet the stiffness and crash resistance requirements of the vehicle.

To this end, the present invention relates to a tunnel for a motor vehicle made of a single part and comprising a main tunnel portion and at least one lateral reinforcement element located on the side of said main tunnel portion wherein said main tunnel portion comprises a main portion lower contour comprising a rear lower contour extending in a substantially longitudinal direction towards the rear of the vehicle, a front lower contour extending in a direction having a positive upward angle of at least 20° with the longitudinal direction towards the front of the vehicle, an inflexion region connecting a rear lower contour front end point to a front lower contour rear end point and extending in a direction having a positive upward angle strictly comprised between 5° and 20° with the longitudinal direction, and wherein said lateral reinforcement element extends over at least part of said main portion lower contour and comprises a groove extending over at least part of its length comprising an inner longitudinal wall bordering at least part of the main portion lower contour, an inner vertical wall bordering said inner horizontal wall, a lower longitudinal wall bordering said inner vertical wall wherein, for all transverse cross-sections of the tunnel comprising the groove, said lower longitudinal wall forms a line substantially parallel to the inner longitudinal wall and located at a lower elevation than said inner longitudinal wall, an outer vertical wall bordering said lower longitudinal wall, an outer longitudinal wall bordering said outer vertical wall wherein for all transverse cross-sections of the tunnel comprising the groove, said outer longitudinal wall forms a line substantially parallel to the inner longitudinal wall and located at a higher elevation than said lower longitudinal wall, wherein said groove extends over a length portion of the rear lower contour, from the rear lower contour front end point towards the rear of the vehicle, and wherein said groove extends over a length portion of the inflexion region, from said rear lower contour front end point towards the front of the vehicle.

By applying the invention, the lateral reinforcement structure of the tunnel is directly integrated in the design of the tunnel itself, and no further lateral reinforcements are required to ensure the stiffness and crash resistance requirements of the tunnel. Furthermore, because the lateral reinforcement structures are built in to a single part, there is no need to take specific care when assembling further lateral reinforcement parts, which need to have a very tight connection with the tunnel in order not to be disassembled under the influence of static of dynamic loading.

According to other optional features of the tunnel according to the invention, considered alone or according to any possible technical combinations:

The tunnel comprises two lateral reinforcement structures located on either side of the main tunnel portion.

The groove further extends over a length portion of the front lower contour.

The groove extends over the full length of the rear lower contour.

The groove extends over the full length of inflexion region.

The sum of the front inner volume of the groove and the inflexion inner volume of the groove is greater than 10% of the total inner volume of the groove.

The rear surface area of the groove is greater than 70% of the ratio between the rear inner volume of the groove and the rear length of the groove.

The tunnel has an ultimate tensile strength above 900 MPa.

The tunnel is made by cold stamping a steel blank comprising at least a portion having a chemical composition comprising in weight %: 0.15%<C<0.25%, 1.4%<Mn<2.6%, 0.6%<Si<1.5%, 0.02%<Al<1.0%, with 1.0%<Si+Al<2.4%, Nb<0.05%, Cr<0.5%, Mo<0.5%, the remainder being Fe and unavoidable impurities and having a microstructure comprising between 10% and 20% of retained austenite, the remainder being ferrite, martensite and bainite, a tensile strength of at least 980 MPa.

The tunnel is made by cold stamping a steel blank comprising at least a portion having a chemical composition comprising in weight %: 0.13%<C<0.25%, 2.0%<Mn<3.0%, 1.2%<Si<2.5%, 0.02%<Al<1.0%, with 1.22%<Si+Al<2.5%, Nb<0.05%, Cr<0.5%, Mo<0.5%, Ti<0.05%, the remainder being Fe and unavoidable impurities and having a microstructure comprising between 8% and 15% of retained austenite, the remainder being ferrite, martensite and bainite, wherein the sum of martensite and bainite fractions is comprised between 70% and 92%, and having a tensile strength of at least 1180 MPa.

The tunnel is a cold stamped tailor welded blank comprising at least a front blank portion and a rear blank portion.

The tunnel is a cold stamped tailor welded blank wherein the thickness of the front blank portion is higher than the thickness of the rear blank portion.

The tunnel is a cold stamped tailor welded blank wherein the ultimate tensile strength of the front blank portion is lower than the ultimate tensile strength of the rear blank portion.

The tunnel is a cold stamped tailor welded blank wherein the product of the thickness of the front blank portion by the yield strength of the front blank portion is less than or equal to the product of the thickness of the rear blank portion by the ultimate tensile strength of the rear blank portion.

The tunnel is a cold stamped tailor rolled blank.

The present invention also concerns a method for producing a tunnel, as described above, comprising the steps of:
providing a blank,
forming the blank into the tunnel by cold forming.

According to other optional features of the method according to the invention, considered alone or according to any possible technical combinations, the method further comprises the steps of:
providing a tailor welded blank comprising at least a front blank portion and a rear blank portion,
providing a tailor rolled blank.

BRIEF DESCRIPTION OF THE DRAWINGS

Other aspects and advantages of the invention will appear upon reading the following description, given by way of examples, and made in reference to the appended drawings, wherein:

FIGS. 5A, 5B and 5C is a series of three cross-sections views according to axis A-A, B-B and C-C of FIG. 2.

DETAILED DESCRIPTION

In the following description, the terms "above", "below", "lower", "upper," "downwards", "upwards", "front", "rear", "transverse", "transversal" and "longitudinal" are defined according to the usual directions of a mounted vehicle. More particularly, the terms "above", "below", "lower", "upper", "downwards" and "upwards" are defined according to the elevation direction of the vehicle, the terms "front", "rear" and "longitudinal" are defined according to the front/rear direction of the vehicle and the terms "transversal" and "transverse" are defined according to the width of the vehicle. The terms "right-hand side" and "left-hand side" are defined according to the referential of an occupant of the vehicle, who is facing towards the normal forward driving direction of the vehicle. By "substantially parallel" or "substantially perpendicular" it is meant a direction which can deviate from the parallel or perpendicular direction by no more than 15°.

Figure 1:
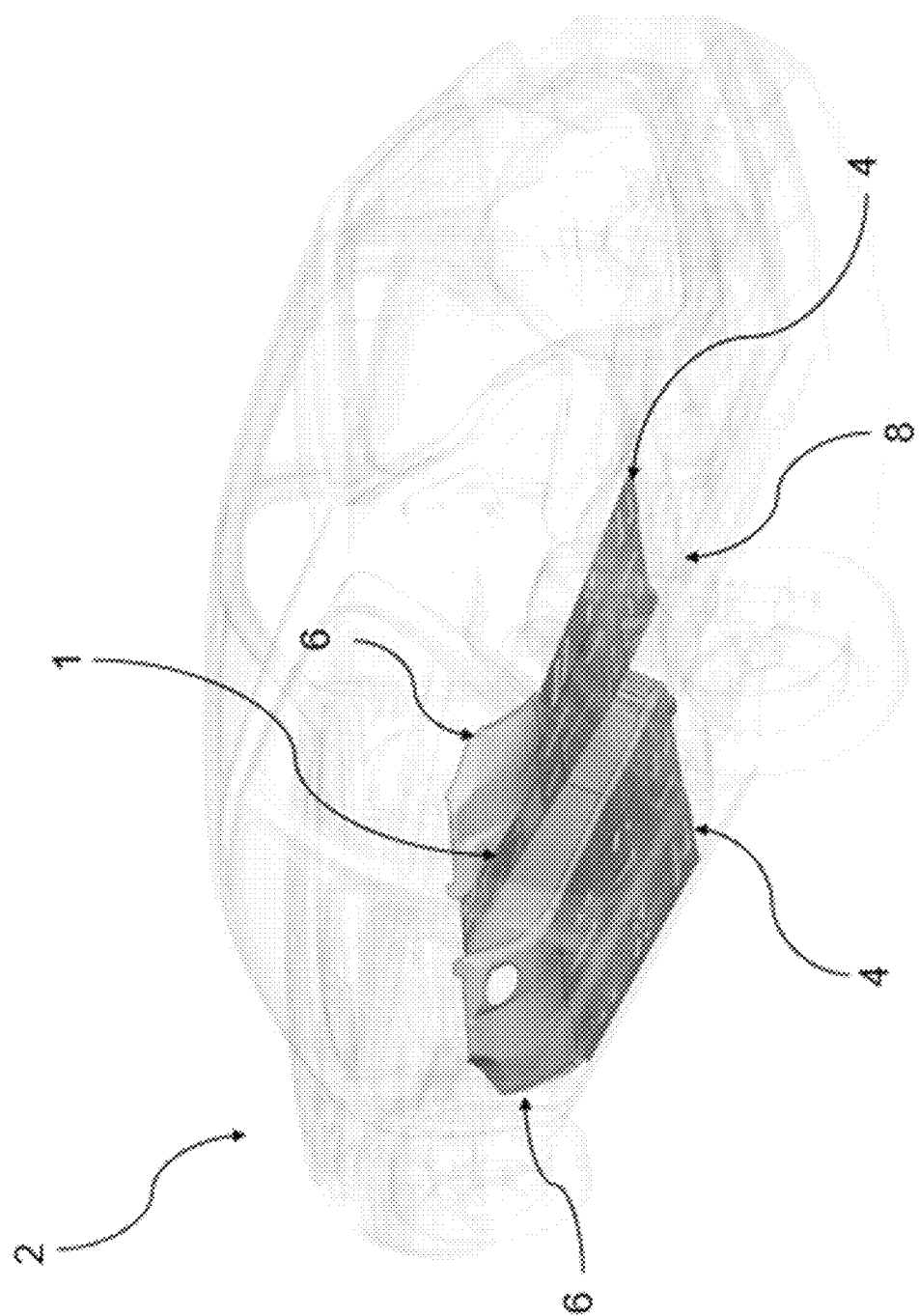
FIG. 1 is an overall perspective view of a vehicle including a tunnel according to the invention.

Referring to FIG. 1, a tunnel 1 for an automotive vehicle 2 will be described. The tunnel 1 is attached to the rest of the automotive vehicle 2 for example by spot welding. In a particular embodiment, the tunnel 1 is attached at the front end to the lower dash panel 6, on its sides to the front floor panels 4 and on its rear end to the rear floor structure 8.

Figure 2:
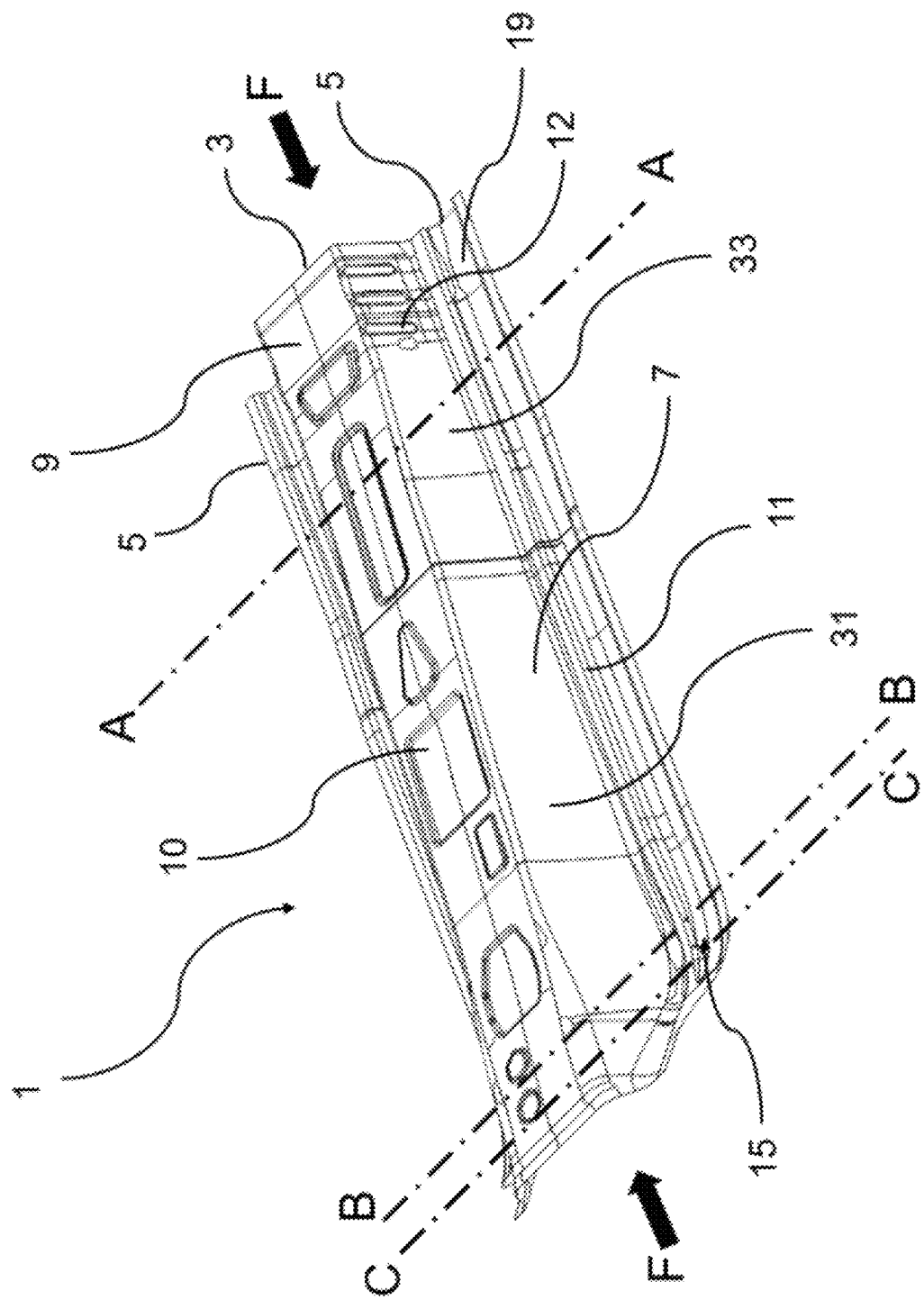
FIG. 2 is a perspective top view of the tunnel according to the invention.

Referring to FIG. 2, the tunnel 1 according to the invention is made of a single part, and comprises a main tunnel portion 3 and at least one lateral reinforcement element 5 located on the side of said main tunnel portion 3.

The main tunnel portion 3 consists of at least two vertical walls 7 linked together by at least one top wall 9. According to a particular embodiment, as depicted in FIG. 1, the top wall 9 comprises several openings 10 designed to host specific elements, such as for example the gear box of the vehicle. According to a particular embodiment, as depicted in FIG. 2, the vertical walls 7 comprise one or several geometrical alterations 12 designed for example to increase the stiffness of the tunnel 1. The bottom edge of the vertical walls 7 are delimited by a main portion lower contour 11.

Figure 4:
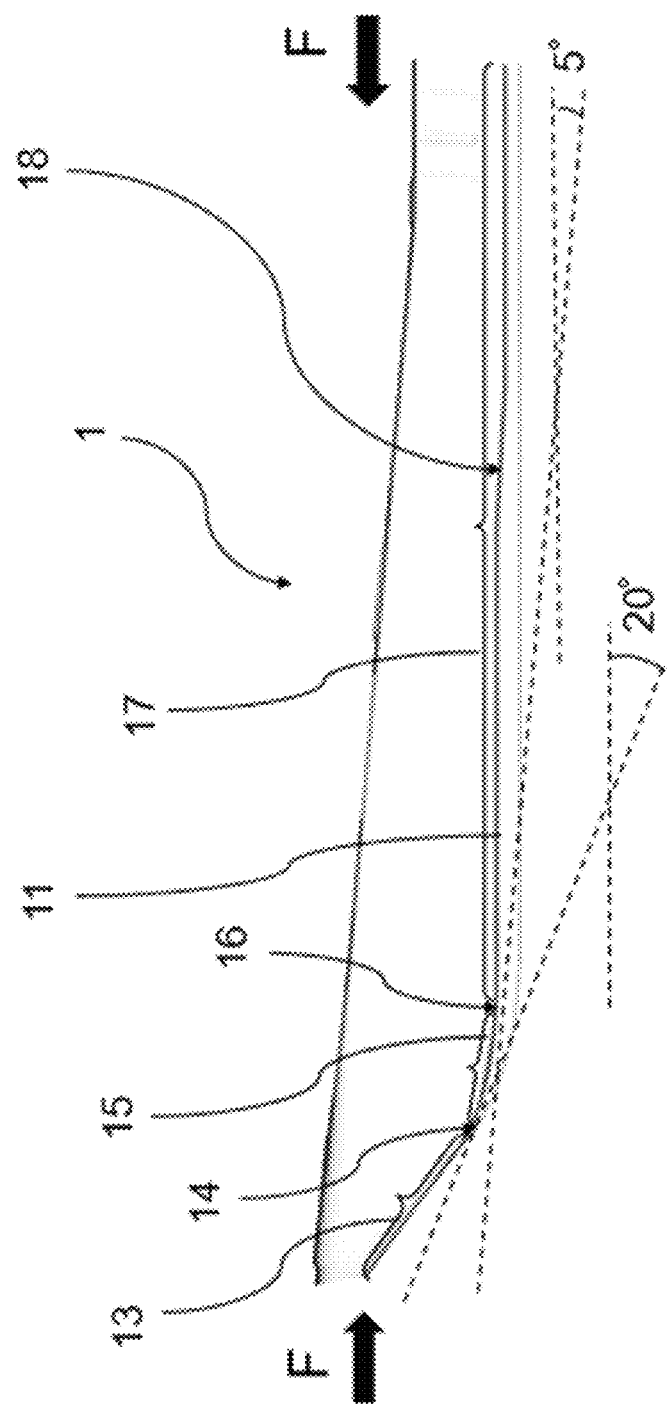
FIG. 4 is a side view of the tunnel according to the invention.

Referring to FIG. 4, the main portion lower contour 11 comprises:
a front lower contour 13 extending in a direction having a positive upward angle of at least 20° with the longitudinal direction towards the front of the vehicle,
a rear lower contour 17 extending in a substantially longitudinal direction towards the rear of the vehicle,
an inflexion region 15 connecting said front lower contour 13 to said rear lower contour 17.

The shape of the front lower contour 13 is designed to fit the shape of the lower dash panel 6 to which the tunnel 1 is attached at its front end (see, e.g., FIG. 1). The lower dash panel 6 separates the passenger compartment from the front end of the vehicle, which houses either an engine or an electric motor or storage space. The lower dash panel 6 is attached for example at its bottom end to the front floor panel 4 and at its top end to an upper dash panel. In order to optimize the passenger space, and in particular the leg room space for the occupants of the front of the vehicle, and in order to efficiently act as isolation between the front compartment and the passenger compartment, the general direction of the lower dash panel 6 follows a positive upward angle versus the horizontal direction, the bottom part of said lower dash panel 6 being located further towards the rear of the vehicle than the top part of said lower dash panel 6. As a result, the front lower contour 13 extends in an upwards direction, and more particularly following a direction which forms an angle higher than 20° with the horizontal direction. The front lower contour 13 extends between the front end of the tunnel 1 and a front lower contour rear end point 14.

It should be noted that the front lower contour 13 has a shape which matches the shape of the lower dash panel 6 and which does not necessarily extend in a rectilinear direction. In a particular embodiment, the lower dash panel 6 has a curved shape and the front lower contour 13 extends in a curvilinear direction, the derivative of which at each point of the front lower contour 13 extends in a direction having an angle higher than 20° with the longitudinal direction.

The shape of the rear lower contour 17 is designed to espouse the shape of the front floor panel 4, to which the tunnel 1 is attached on its sides. Because the front floor panel 4 is a generally flat part extending in a plane substantially parallel to the longitudinal direction, the rear lower contour 17 forms a generally rectilinear shape extending in a substantially longitudinal direction. In a particular embodiment, the rear lower contour 17 comprises one or several minor deviations from the rectilinear shape 18, such as depicted in FIG. 4, for example in order to follow the shape of the front floor panel 4. The rear lower contour 17 extends between the rear end of the tunnel 1 and a rear lower contour front end point 16.

The inflexion region 15 is a generally curvilinear portion of the main portion lower contour 11 linking the front lower contour 13 to the rear lower contour 17 and such as the derivative of the inflexion region 15 at each point extends in a direction having an angle strictly comprised between 5° and 20° with the longitudinal direction.

In other words, when following a point travelling along the main portion lower contour 11, starting at the front end of tunnel 1 and travelling towards the rear of the vehicle:

said point will first travel downwards along the front lower contour 13 following a trajectory having an angle of strictly more than 20° with the longitudinal direction, said point will then reach a point at which the angle of its trajectory with the longitudinal direction is exactly 20°, this point is the front lower contour rear end point 14, as it continues its journey towards the rear of the vehicle, after crossing the front lower contour rear end point 14, said point will enter the inflexion region 15, as it continues travelling towards the rear end of the vehicle, said point will then reach a point at which the angle of its trajectory with the longitudinal direction is exactly 5°, this point is the rear lower contour front end point 16, as it continues its journey towards the rear of the vehicle, after crossing the rear lower contour front end point 16, said point will enter the rear lower contour 17, said point will then travel along the rear lower contour 17, following a substantially longitudinal direction, until it reaches the rear end of the rear lower contour 17.

Because the main tunnel portion 3 is an open U-shape having a long longitudinal component, it will be sensitive to static loads applied to it. For example, a static compressive load applied between the front end and the rear end of the main tunnel portion 3 will have a tendency to bend the top wall 9 and to pry open said main tunnel portion 3, in other words to increase the angle between the vertical walls 7 and the top wall 9 (see, e.g., FIG. 2). Applying a static torsional load having a longitudinal axis will have a tendency to twist the top wall 9, which will in turn result in a warping of the vertical walls 7. The above described responses of the main tunnel portion 3 to static loads is linked to the overall stiffness of the tunnel 1. The higher the stiffness of the tunnel 1, the less sensitive it is to the above described deformations of the main tunnel portion 3 under static loads.

Because the main portion lower contour 11 comprises an inflexion region 15, the main tunnel portion 3 will be sensitive to a substantially longitudinal dynamic compression load F, as depicted in FIGS. 2 and 4, applied between the front end and the rear end of the tunnel 1. Such dynamic compression load F will occur during a frontal crash, through the transmission of the load of the crash by the vehicle structure, in particular through the effect of compression of the tunnel 1 by the parts to which it is attached at its front end and rear end, such as for example the lower dash panel 6 and the rear floor structure 8. Under such load conditions, the dynamic compressive load F will result in a concentrated collapse behavior in the inflexion region 15, which will have a tendency to increase the upward angle between the front lower contour 13 and the longitudinal direction. In other words, the dynamic compressive load F will have a tendency to bend upwards the part of the main tunnel portion 3 which is bordered by the front lower contour 13. As a result of the concentrated collapse behavior in the inflexion region 15, this region is sensitive to the formation of cracks during a frontal crash, which will be detrimental to the overall resistance of the vehicle to a frontal crash. Furthermore, a concentrated collapse behavior of the inflexion region 15 will result in the increase of intrusion of the impactor into the passenger compartment of the vehicle, which will lead to an unacceptable safety performance of the vehicle.

In the current invention, in order to improve the stiffness and the resistance to frontal crash of the tunnel 1, the main tunnel portion 3 is advantageously reinforced by at least one lateral reinforcement element 5. In the current invention, the main tunnel portion 3 and the lateral reinforcement element 5 are integrated in a single part, the tunnel 1.

Figure 3:
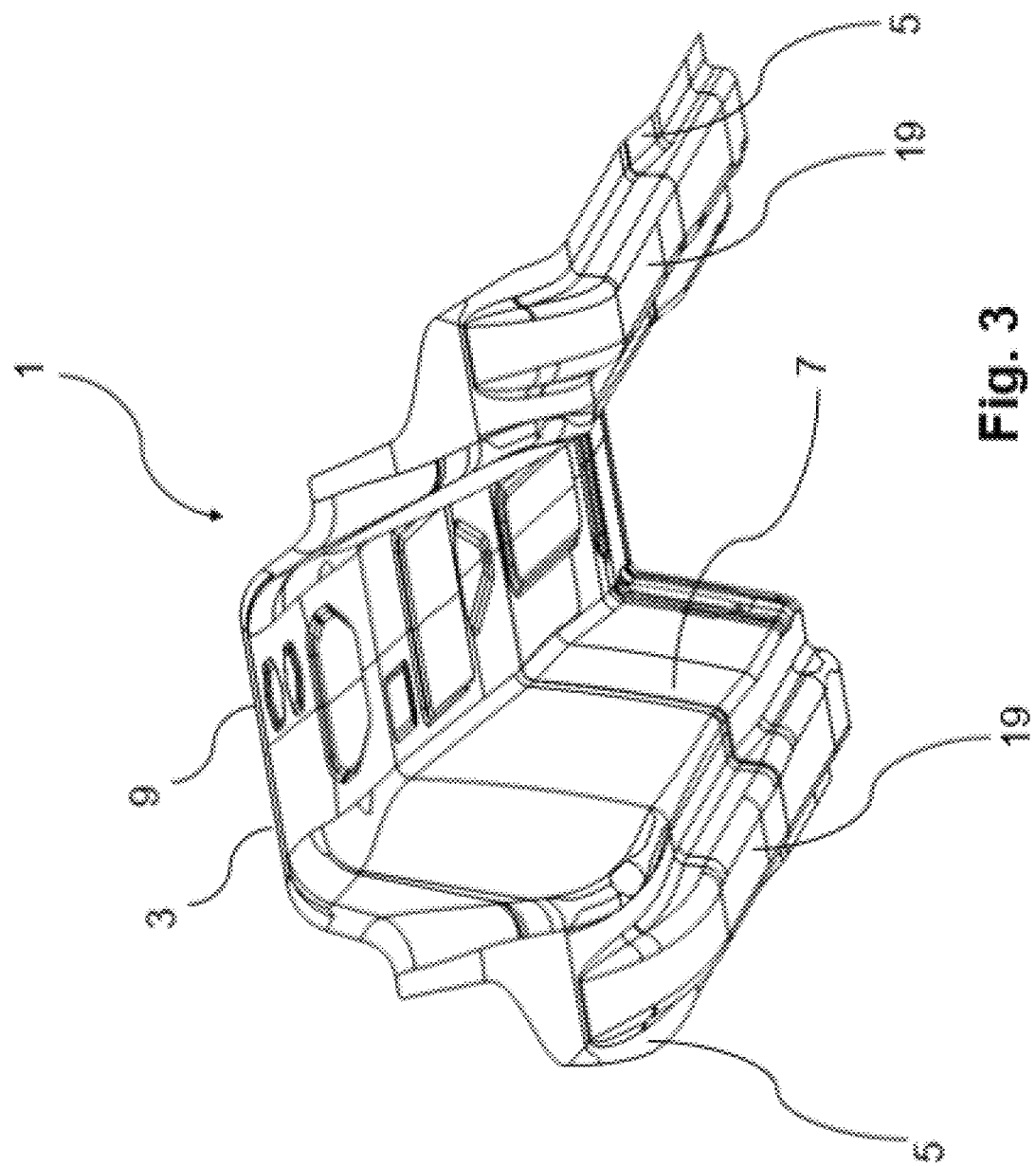
FIG. 3 is a perspective bottom view of the tunnel according to the invention.

The lateral reinforcement element 5 extends over at least part of the main portion lower contour 11. In order to increase the crash resistance and the stiffness of the tunnel 1, the lateral reinforcement element 5 comprises a groove 19 (see, e.g., FIG. 3). Said groove 19 comprises vertical and horizontal walls and has the advantageous effect of rigidifying the overall structure of the tunnel 1 and therefore of advantageously increasing the stiffness of the tunnel 1 and improving its resistance in the case of a frontal crash.

As depicted in FIGS. 5A, 5B and 5C, the groove 19 comprises:

an inner longitudinal wall 21 bordering at least part of the main portion lower contour 11, an inner vertical wall 23 bordering said inner horizontal wall 21, a lower longitudinal wall 25 bordering said inner vertical wall 23 wherein, for all transverse cross-sections of the tunnel 1 comprising the groove 19, said lower longitudinal wall 25 forms a line substantially parallel to the inner longitudinal wall 21 and located at a lower elevation than said inner longitudinal wall 21, an outer vertical wall 27 bordering said lower longitudinal wall 25, an outer longitudinal wall 29 bordering said outer vertical wall 27 wherein for all transverse cross-sections of the tunnel 1 comprising the groove 19, said outer longitudinal wall 29 forms a line substantially parallel to the lower longitudinal wall 25 and located at a higher elevation than said lower longitudinal wall 25.

In a particular embodiment, the lateral reinforcement structure 5 also advantageously acts as a flange serving as an attachment area between the tunnel 1 and the surrounding parts. In a particular embodiment, the front floor panel 4 comes on top of the lateral reinforcement structure 5 and is attached, for example by spot welding to the inner horizontal wall 21 and to the outer horizontal wall 29. In a particular embodiment, the lower dash panel 6 comes on top of the front of the reinforcement structure 5 and is attached to said reinforcement structure 5, for example by spot welding.

In order to efficiently increase the stiffness of the tunnel 1, the groove 19 extends over at least part of the rear lower contour 17. More specifically, the groove 19 extends over a non-zero length portion of the rear lower contour 17, as measured in the longitudinal direction, from the rear lower contour front end point 16 towards the rear of the vehicle.

In a particular embodiment, depicted in FIG. 2, the groove 19 extends over the full length of the rear lower contour 17. Advantageously, because the rear lower contour 17 covers a large portion of the open U-shaped main tunnel portion 3, this will further increase the overall stiffness of the tunnel 1.

In order to efficiently increase the resistance of the inflexion region 15 in the case of a frontal crash, the groove 19 extends over at least part of the inflexion region 15. More specifically, the groove 19 extends over a non-zero length portion of the inflexion region 15, as measured in the longitudinal direction, extending from the rear lower contour front end point 16 towards the front of the vehicle. Indeed, the sensitivity to crack formation of the tunnel 1 under the dynamic compression load F is linked to the geometrical singularity at the rear lower contour front end point 16, where the direction of the rear lower contour 11 changes from a substantially longitudinal direction in the rear lower contour 17 to a direction having an upward angle in the inflexion region 15 (see, e.g, FIG. 4). Because the rear lower contour 17 extends in a direction which is substantially parallel to the dynamic compressive load F, it will not move under the effect of the dynamic compressive load F. On the other hand, because the inflexion region 15 and the front lower contour 13 have an angle of at least respectively 5° and 20° towards the longitudinal direction, the dynamic compression load F will have the effect of pushing the inflexion region 15 and the front lower contour 13 towards the rear of the vehicle. The combination of the lack of movement of the rear lower contour 17 and the backward movement of both the inflexion region 15 and the front lower contour 13 results in a collapse behavior at the rear lower contour front end point and subsequently an important load concentration at this point. Advantageously, by reinforcing the rear lower contour front end point 16 with the groove 19, the resistance to crack formation and to intrusion in the passenger compartment during a frontal crash of the tunnel 1 will improve, thereby contributing to an overall increase in frontal crash resistance of the vehicle.

In a particular embodiment, the groove 19 extends over the full length of the inflexion region 15. Indeed, by reinforcing the rear lower contour front end point 16, as previously described, there is a possibility that the collapse behavior resulting from the antagonistic movements under the dynamic compression load F of the rear lower contour 17 and the front lower contour 13 will be displaced to a weaker area of the inflexion region 15, in particular to an area of the inflexion region 15 which is not reinforced by the groove 19. In particular, the collapse behavior will have a tendency to concentrate in the area of the inflexion region 15 next to the point at which the groove 19 ends. By designing the lateral reinforcement element 5 so that the groove 19 extends over the full length of the inflexion region 15, the risk of crack formation in the inflexion region 15 during a frontal crash advantageously further diminishes.

In a particular embodiment, the groove 19 extends over at least part of the front lower contour 13. This is particularly advantageous when the front lower contour 13 comprises at least part of a curvilinear portion in which the angle towards the longitudinal direction evolves. Indeed, any change in angle towards the longitudinal direction can result in a collapse behavior and a load concentration, for the same reasons as described above. Advantageously, designing the lateral reinforcement element 5 so that the groove 19 extends over at least part of the front lower contour 13, and in particular over a curvilinear portion of the front lower contour 13, further diminishes the risk of crack formation in the case of a frontal crash.

The total inner volume of the groove 19 is defined as the volume comprised within the confines of the inner vertical wall 23, the lower horizontal wall 25, the outer vertical wall 27 and a fourth plane corresponding to the extension of the inner horizontal wall 21 above the lower horizontal wall 25. The front inner volume of the groove 19 is defined as the inner volume of the groove 19 as measured in the section of the groove 19 extending over the front lower contour 13. The inflexion inner volume of the groove 19 is defined as the inner volume of the groove 19 as measured in the section of the groove 19 extending over the inflexion region 15.

In a particular embodiment, the sum of the front inner volume of the groove 19 and the inflexion inner volume of the groove 19 is greater than 10% of the total inner volume of the groove 19. Advantageously, designing a lateral reinforcement 5 with a groove 19 having a minimum front inner volume and inflexion inner volume guarantees a good protection against crack formation in the front lower contour 13 and the inflexion region 15. Furthermore, ensuring a minimum ratio between the sum of the front and inflexion inner volumes of the groove 19 and the total inner volume of the groove 19 will efficiently prevent the transmission of compressive efforts during a front crash to the rear lower contour 17, thereby preventing the formation of cracks within the rear lower contour 17. The rear inner volume of the groove 19 is defined as the inner volume of the groove 19 in the section of said groove 19 extending over the rear lower contour 17. The rear length of the groove 19 is defined as the length of the groove 19 extending over the rear lower contour 17, as measured in the longitudinal direction. The rear surface area of the groove 19 is defined as the surface of the transverse cross section of the groove 19 at the furthermost rear part of the groove 19. More specifically, said area is comprised within the confines of the three physical lines formed by the cross sections of the inner vertical wall 23, the lower horizontal wall 25, the outer vertical wall 27 and a fourth line corresponding to the cross section of the extension of the inner horizontal wall 21 above the lower horizontal wall 25.

In a particular embodiment, the rear surface area of the groove 19 is greater than 70% of the ratio between the rear inner volume of the groove 19 and the rear length of the groove 19. Advantageously, designing a lateral reinforcement 5 with a groove 19 having a minimum rear surface area ensures that the reinforcing and rigidifying functions of the groove 19 is fulfilled up to the furthermost rear part of the groove 19. Furthermore, ensuring a minimum relative ratio between the rear surface area and the ratio of the rear inner volume to the rear length of the groove 19 ensures that the reinforcing behavior of the groove 19 stays consistent throughout the length of the portion of the groove 19 extending over the rear lower contour 17, which avoids stress concentrations in weaker points of the rear lower contour 17, thereby preventing the formation of cracks during a front crash.

In a particular embodiment, the tunnel 1 comprises two lateral reinforcement elements 5 located on either side of the main tunnel portion 3. Both lateral reinforcement elements 5 are integral with the main tunnel portion 3 and form a single part, the tunnel 1. Advantageously, this further increases the overall stiffness and frontal crash resistance of the tunnel 1.

In a particular embodiment, the tunnel 1 is made of material having an ultimate tensile strength above 900 MPa. Because the tunnel is a central structural part of the vehicle, involved in the overall stiffness and crash resistance performance of the vehicle, using a material with a high ultimate tensile strength, for example above 900 MPa, advantageously allows the tunnel 1 to contribute positively to the overall stiffness and crash performance of the vehicle.

In a particular embodiment, at least part of the blank used to form the tunnel 1 comprises steel.

In a particular embodiment, the tunnel 1 is made by cold stamping a steel blank comprising at least a portion having a chemical composition comprising in weight %: $0.15\%<C<0.25\%$, $1.4\%<Mn<2.6\%$, $0.6\%<Si<1.5\%$, $0.02\%<Al<1.0\%$, with $1.0\%<Si+Al<2.4\%$, $Nb<0.05\%$, $Cr<0.5\%$, $Mo<0.5\%$, the remainder being Fe and unavoidable impurities and having a microstructure comprising between 10% and 20% of retained austenite, the remainder being ferrite, martensite and bainite, having and a tensile strength of at least 980 MPa. Advantageously, thanks to the high ultimate tensile strength, such characteristics confer a high stiffness and a high resistance to the loads incurred during a frontal crash. At the same time, thanks to, among others, the presence of retained austenite, such characteristics also confer a high formability to the blank, enabling to stamp the material in the complex shape resulting for example from the presence of the groove 19 in the inflexion region 15.

In a particular embodiment, the tunnel 1 is made by cold stamping a steel blank comprising at least a portion having a chemical composition comprising in weight %: $0.13\%<C<0.25\%$, $2.0\%<Mn<3.0\%$, $1.2\%<Si<2.5\%$, $0.02\%<Al<1.0\%$, with $1.22\%<Si+Al<2.5\%$, $Nb<0.05\%$, $Cr<0.5\%$, $Mo<0.5\%$, $Ti<0.05\%$, the remainder being Fe and unavoidable impurities and having a microstructure comprising between 8% and 15% of retained austenite, the remainder being ferrite, martensite and bainite, wherein the sum of martensite and bainite fractions is comprised between 70% and 92%, and having a tensile strength of at least 1180 MPa. Advantageously, thanks to the high ultimate tensile strength, such characteristics confer a high stiffness and a high resistance to the loads incurred during a frontal crash. At the same time, thanks to, among others, the presence of retained austenite, such characteristics also confer a high formability to the blank, enabling to stamp the material in the shape of the tunnel 1.

In a particular embodiment, as depicted in FIG. 2, the tunnel 1 is made from a tailor welded blank comprising at least a front blank portion, corresponding to a front part 31 of the tunnel 1 located towards the front of the vehicle, which comprises at least the front lower contour 13 and the inflexion region 15, and a rear blank portion corresponding to a rear part 33 of the tunnel 1 located towards the rear of the vehicle.

In a particular embodiment, the front blank portion is made of a thicker material than the rear blank portion. The higher thickness of the front blank portion serves both to advantageously increase the resistance to the high amount of transmitted efforts from the front end of the vehicle during a frontal crash and to increase the formability in the front part 31, which has a complex shape, in particular in the area of the lateral reinforcement element 5 bordering the inflexion region 15 and comprising a groove 19. For example, the tunnel 1 is made of a tailor welded blank comprising a front blank portion having a thickness of 1.5 mm and a rear blank portion having a thickness of 1.0 mm.

In a particular embodiment, the front blank portion is made of a material having a lower tensile strength and a higher thickness than the material of the rear blank portion. Advantageously, the higher thickness of the front blank portion enables it to withstand the high amounts of transmitted efforts from the front end of the vehicle during a frontal crash. Advantageously, the higher thickness and lower tensile strength of the front blank portion renders it easier to stamp in the complex shape of the front part 31. The rear part 33, corresponding to the rear blank portion does not need to have such a high thickness because it does not need to withstand such high transmitted efforts during a frontal crash. Furthermore, the rear part 33 has a more simple shape to stamp than the front part 31 and can therefore be made of a material having higher tensile strength and lower formability. By placing a higher thickness material in the front blank portion and a lower thickness material with a higher tensile strength in the rear blank portion, it is possible to advantageously diminish the weight of the tunnel 1 while ensuring good formability, good crash resistance properties and good overall stiffness properties.

When stamping a tailor welded blank such as the one recited above, having materials of different thickness and different tensile strength, there is a risk that cracks will occur around the weld area in the weakest material between both, because the amount of effort necessary to form the higher thickness blank portion could exceed the amount of effort that the lower thickness blank portion can withstand without cracking. In order to overcome this difficulty, one solution is to verify the following condition: in a particular embodiment, the tunnel 1 is made by cold stamping of a tailor welded blank having a front blank portion which is made of a material with a lower tensile strength and a higher thickness than the material of the rear blank portion and such as the product of the thickness of the front blank portion by the yield strength of the front blank portion is less than or equal to the product of the thickness of the rear blank portion by the ultimate tensile strength of the rear blank portion. Advantageously, by verifying the above stated condition, the maximum load to form the front blank portion, which is related to the product of the thickness of the front blank portion by the yield strength of the front blank portion, will not exceed the maximum allowable load in the rear blank portion to avoid cracking, which is related to the product of the thickness of the rear blank portion by the ultimate tensile strength of the rear blank portion. For example, the tunnel is made from a tailor welded blank having a front blank portion made of a steel having a tensile strength of at least 980 MPa and having a thickness of 1.5 mm and a rear blank portion made of a steel having a tensile strength of at least 1180 MPa and having a thickness of 1.0 mm. In such a case, the front blank portion has a thickness of 1.5 mm and a yield strength of 550 MPa, the rear blank portion has a thickness of 1.0 mm and an ultimate tensile strength of 1180 MPa. The product of the yield strength by the thickness of the front blank portion is 825, which is lower than the product of the thickness by the ultimate tensile strength of the rear blank portion, which is 1180.

In a particular embodiment, the tunnel 1 is made from a tailor rolled blank. For example, the tunnel 1 is made of a tailor rolled blank having a higher thickness in the front blank portion than in the rear blank portion. For example, the front blank portion has a thickness of 1.5 mm and the rear blank portion has a thickness of 1.0 mm.

The tunnel described above, comprising an integrated lateral reinforcement element with a groove extending over at least a non-zero length between a rear lower contour front end point towards the rear of the vehicle and extending over at least a non-zero length between said rear lower contour front end point towards the front of the vehicle, offers the advantage of providing a single part tunnel with high stiffness and high resistance to frontal crash.

Another advantage of the above described tunnel is that the method to manufacture said tunnel involves a single forming operation, without the need for additional manufacturing and assembly of separate lateral reinforcing elements to form the complete tunnel structure.

The method comprises the step of providing a blank. The method further comprises the step of forming said blank into the tunnel 1 by cold forming.

According to a variant the method comprises the step of providing a tailor welded blank comprising at least a front blank portion and a rear blank portion. The method further comprises the step of forming said tailor welded blank into the tunnel 1 by cold forming.

In a particular embodiment the front blank portion is made of a steel having a tensile strength of at least 980 MPa having a thickness of 1.5 mm and the rear blank portion is made of a steel having a tensile strength of at least 1180 MPa having a thickness of 1.0 mm.

According to a variant, the method comprises the step of providing a tailor rolled blank comprising at least a front blank portion and a rear blank portion. The method further comprises the step of forming said tailor rolled blank into the tunnel 1 by cold forming.

The tunnel 1 is then integrated in the rest of the automotive vehicle by fastening it to the vehicle body, for example by spot welding it to the surrounding parts.

What is claimed is:

1. A tunnel for a motor vehicle made of a single part and comprising:
    a main tunnel portion; and
    at least one lateral reinforcement element located on a side of the main tunnel portion;
    the main tunnel portion having a main portion lower contour including:
        a rear lower contour extending in a longitudinal direction towards a rear of the vehicle;
        a front lower contour extending in a direction having a positive upward angle of at least 20° with the longitudinal direction towards a front of the vehicle; and
        an inflexion region connecting a rear lower contour front end point to a front lower contour rear end point and extending in a direction having a positive upward angle strictly comprised between 5° and 20° with the longitudinal direction;
    the lateral reinforcement element extending over at least part of the main portion lower contour and including a groove extending over at least part of a length of the lateral reinforcement element, the groove including:
        an inner longitudinal wall bordering at least part of the main portion lower contour;
        an inner vertical wall bordering the inner longitudinal wall;
        a lower longitudinal wall bordering the inner vertical wall, wherein, for all transverse cross-sections of the tunnel including the groove, the lower longitudinal wall forms a plane parallel to the inner longitudinal wall and located at a lower elevation than said inner longitudinal wall;
        an outer vertical wall bordering the lower longitudinal wall; and
        an outer longitudinal wall bordering the outer vertical wall, wherein, for all transverse cross-sections of the tunnel including the groove, the outer longitudinal wall forms a plane parallel to the lower longitudinal wall and located at a higher elevation than the lower longitudinal wall;
    wherein the groove extends over a length portion of the rear lower contour, from the rear lower contour front end point towards the rear of the vehicle, and wherein the groove extends over a length portion of the inflexion region, from the rear lower contour front end point towards the front of the vehicle.

2. The tunnel as recited in claim 1 wherein the at least one lateral reinforcement element includes two lateral reinforcement elements located on either side of the main tunnel portion.

3. The tunnel as recited in claim 1 wherein the groove further extends over a length portion of the front lower contour.

4. The tunnel as recited in claim 1 wherein the groove extends over a full length of the rear lower contour.

5. The tunnel as recited in claim 1 wherein the groove extends over a full length of the inflexion region.

6. The tunnel as recited in claim 1 wherein a sum of the front inner volume of the groove and an inflexion inner volume of the groove is greater than 10% of a total inner volume of the groove.

7. The tunnel as recited in claim 1 wherein a rear surface area of the groove is greater than 70% of a ratio between the rear inner volume of the groove and the rear length of the groove.

8. The tunnel as recited in claim 1 wherein the tunnel is made of a material having an ultimate tensile strength above 900 MPa.

9. The tunnel as recited in claim 1 wherein the tunnel is made by cold stamping a steel blank comprising at least a portion having a chemical composition comprising in weight %: 0.15%<C<0.25%, 1.4%<Mn<2.6%, 0.6%<Si<1.5%, 0.02%<Al<1.0%, with 1.0%<Si+Al<2.4%, Nb<0.05%, Cr<0.5%, Mo<0.5%, a remainder being Fe and unavoidable impurities and having a microstructure comprising between 10% and 20% of retained austenite, a microstructure remainder being ferrite, martensite and bainite, and having a tensile strength of at least 980 MPa.

10. The tunnel as recited in claim 1 wherein the tunnel is made by cold stamping a steel blank comprising at least a portion having a chemical composition comprising in weight %: 0.13%<C<0.25%, 2.0%<Mn<3.0%, 1.2%<Si<2.5%, 0.02%<Al<1.0%, with 1.22%<Si+Al<2.5%, Nb<0.05%, Cr<0.5%, Mo<0.5%, Ti<0.05%, a remainder being Fe and unavoidable impurities and having a microstructure comprising between 8% and 15% of retained austenite, a microstructure remainder being ferrite, martensite and bainite, wherein the sum of martensite and bainite fractions is comprised between 70% and 92%, and having a tensile strength of at least 1180 MPa.

11. The tunnel as recited in claim 1 wherein the tunnel is a cold stamped tailor welded blank comprising at least a front part corresponding to a front blank portion and a rear part corresponding to a rear blank portion.

12. The tunnel as recited in claim 11 wherein a thickness of the front blank portion is higher than a thickness of the rear blank portion.

13. The tunnel as recited in claim 11 wherein an ultimate tensile strength of the front blank portion is lower than an ultimate tensile strength of the rear blank portion.

14. The tunnel as recited in claim 13 wherein a product of a thickness of the front blank portion by the yield strength of the front blank portion is less than or equal to a product of a thickness of the rear blank portion by the ultimate tensile strength of the rear blank portion.

15. The tunnel as recited in claim 1 wherein the tunnel is a cold stamped tailor rolled blank.

16. A method for producing the tunnel as recited in claim 1 comprising the steps of:
   providing a blank; and
   forming the blank into the tunnel by cold forming.

17. A method for producing the tunnel as recited in claim 11 comprising the steps of:
   providing the tailor welded blank having at least the front blank portion and the rear blank portion; and
   forming the tailor welded blank into the tunnel by cold forming.

18. A method for producing the tunnel as recited in claim 15 comprising the steps of:
   providing the tailor rolled blank having at least a front blank portion and a rear blank portion; and
   forming the tailor rolled blank into the tunnel by cold forming.

* * * * *